Figure 3:
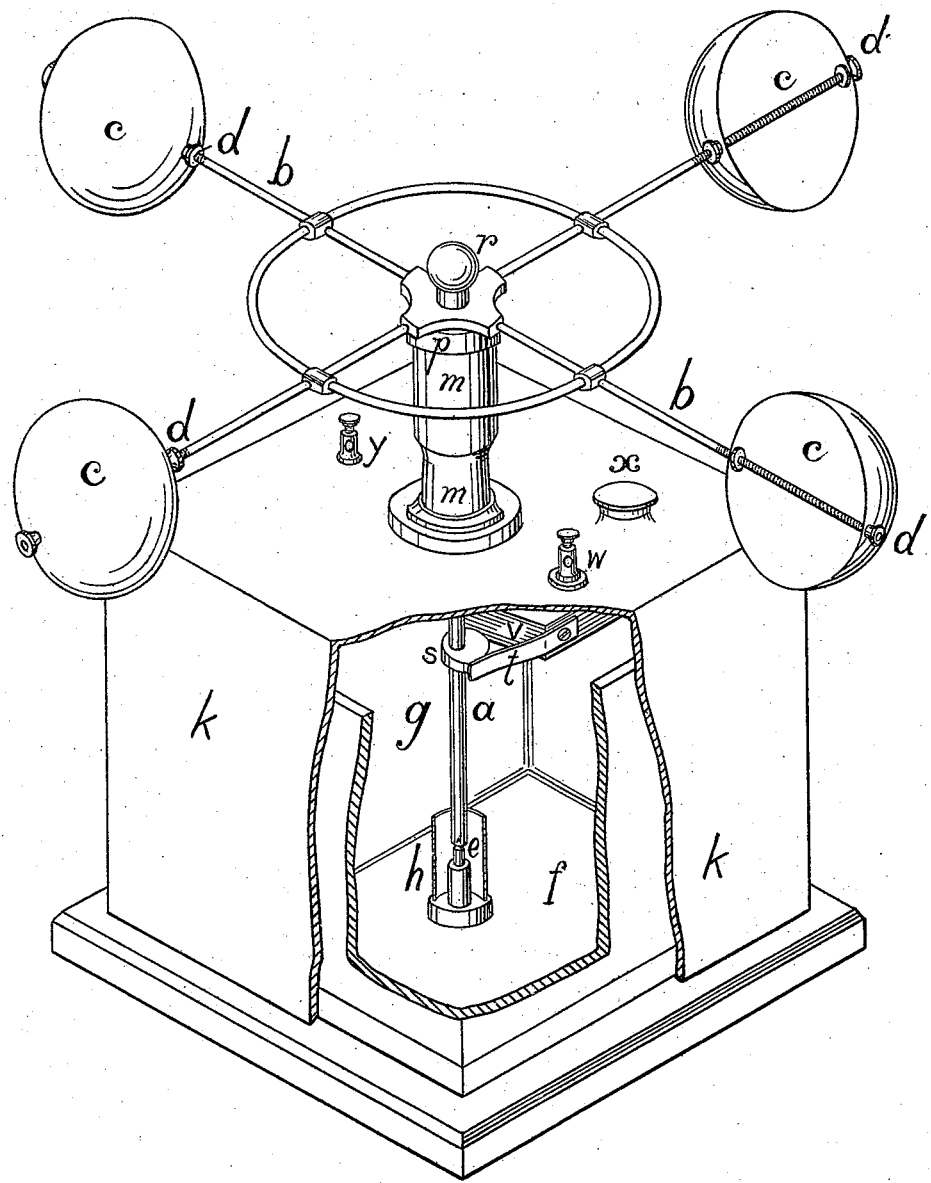

No. 691,082. Patented Jan. 14, 1902.
J. THOMPSON.
APPARATUS FOR MEASURING AIR CURRENTS.
(Application filed Jan. 5, 1901.)
(No Model.) 2 Sheets—Sheet 1.
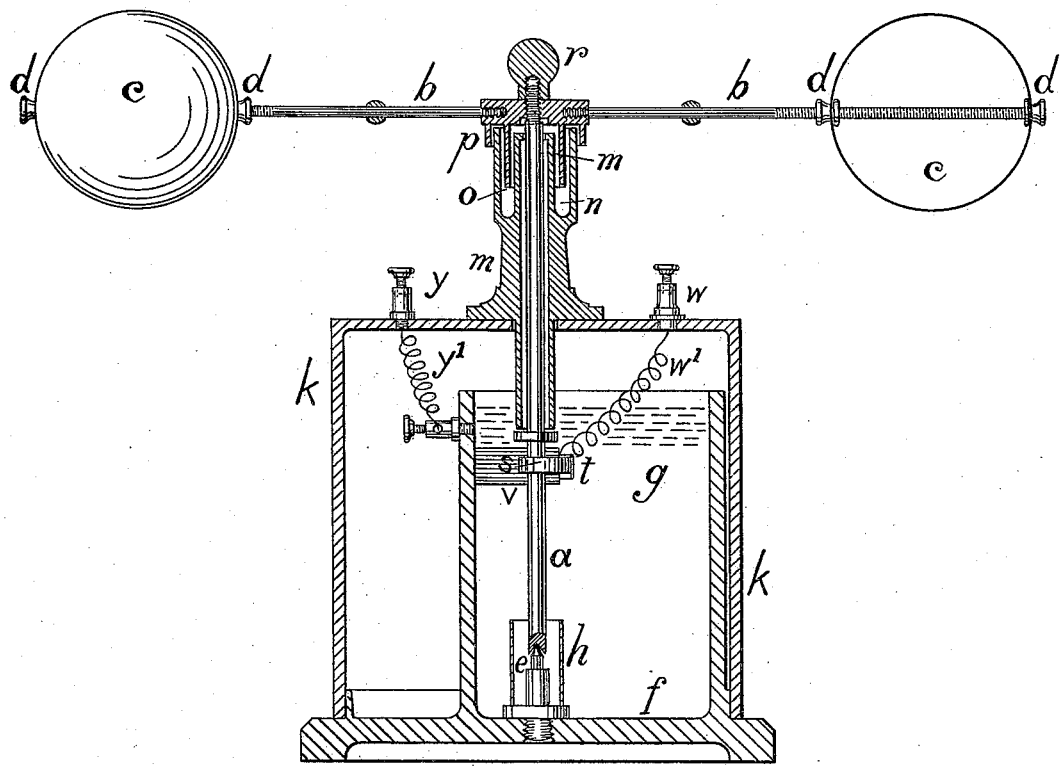
Fig. 1.
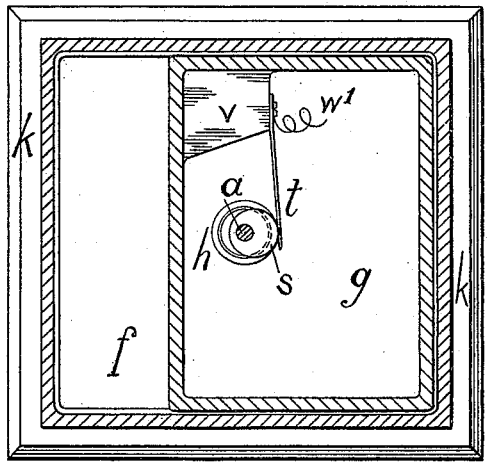
WITNESSES. Fig. 2. INVENTOR.
Joseph Bates. Joseph Thompson
C. W. Alexander. by J. J. O'Brien O'Brien
atty.
THE NORRIS PETERS CO., PHOTO-LITHO., WASHINGTON, D. C.

No. 691,082. Patented Jan. 14, 1902.
J. THOMPSON.
APPARATUS FOR MEASURING AIR CURRENTS.
(Application filed Jan. 5, 1901.)
(No Model.) 2 Sheets—Sheet 2.

UNITED STATES PATENT OFFICE.

JOSEPH THOMPSON, OF MANCHESTER, ENGLAND.

APPARATUS FOR MEASURING AIR-CURRENTS.

SPECIFICATION forming part of Letters Patent No. 691,082, dated January 14, 1902.

Application filed January 5, 1901. Serial No. 42,261. (No model.)

*To all whom it may concern:*

Be it known that I, JOSEPH THOMPSON, a subject of the Queen of Great Britain, and a resident of Manchester, in the county of Lancaster, England, have invented certain new and useful Improvements in Apparatus for Ascertaining the Velocity of Air-Currents, of which the following is a specification.

This invention is designed to provide apparatus for determining and ascertaining with scientific accuracy the volume of ventilation (indicated in cubic feet per minute) passing through coal-mines or other underground workings or structures. The apparatus or instrument may be placed in the ventilating-current of a coal-mine or other situation at any point or points where it is desired to ascertain the amount or velocity of air passing, such velocity providing the essential data from which the volume can be calculated at any distinct points or stations. Hitherto the accuracy of such instruments, particularly in coal-mines, has been effected by the deleterious matter carried by the atmosphere in which they have been placed, such as noxious gases, moisture, steam, vapor, smoke, greasy matter, oil, exhalations from a number of men and horses below ground, gases exuding from the pores of newly-cut coal, and the like. My invention excludes all such deleterious matter from the working parts of the apparatus, and while employing electricity is perfectly proof against electric sparking and is perfectly safe to use in an explosive atmosphere. It will be fully described with reference to the accompanying drawings.

Figure 1 is a vertical section of the instrument. Fig. 2 is a sectional plan. Fig. 3 is a perspective view with part of the casing broken away.

The instrument is constructed with a vertical rotating spindle $a$, to the upper end of which is attached by horizontal arms $b$, radially therefrom, in the form of a cross, four hemispherical cups $c$. The cups $c$ are adjustable on the same arms by nuts $d$, traversing a screw-thread cut upon the extremity of the arms. The arms are also marked with a scale to facilitate the accurate adjustment and setting of the cups $c$ thereon.

The foot of the vertical rotating spindle $a$ rests upon a cone-bearing $e$, secured to the base-plate $f$ of a chamber $g$, in which it is inclosed. The bearing $e$ is formed of a projecting pin or stud and is surrounded by a cup $h$ to protect it. The chamber $g$, in which the spindle rotates, is filled with a non-conducting liquid, such as petroleum-oil, which will prevent any particles of dust, gas, or vapors reaching the bearing and other parts of the spindle submerged therein, thereby maintaining perfect lubrication of the spindle $a$. The chamber $g$ is covered by a tight-fitting or sealed casing $k$, through which it will be difficult for dust to penetrate to the interior.

The spindle $a$ passes through a steadying-bearing $m$ in the top of the casing $k$, and this bearing is rendered air, dust, and vapor proof by an oil-cup $n$, into which depends a flange $o$, projecting from the under side of the radial arms $b$. The flange $o$ rotates in the oil-cup $n$, and the outer flange $p$ covers the outer edge of the oil-cup and rotates free of it. The bearing $m$ projects down into the oil in the chamber $g$ and is thus sealed and rendered dust-proof also at the lower end.

The radial arms $b$, carrying the cups $c$, are securely attached to the vertical spindle $a$ by a screw-knob $r$ or otherwise.

On the spindle $a$ is affixed a cam or eccentric $s$, which rotates with the spindle, and inside the chamber $g$ is placed a contact-piece $t$, supported by and insulated from the casing $f$ by an insulating-piece $v$, all of which are submerged in the non-conducting oil or liquid in the chamber $g$. The contact-piece $t$ is connected by a wire $w'$ with a terminal $w$ outside the case $k$, and the spindle is in electrical contact with the casing $f$, which is connected by a wire with the terminal $y$. As the spindle $a$ rotates the eccentric $s$ alternately makes and breaks contact with the contact-piece $t$, and the rapidity of such making and breaking of contact transmitted over an electric wire is indicated at any convenient station or stations or receiving instrument. An oil-inlet with protecting cover is shown at $x$. Rotary motion is imparted to the cups $c$ as they are caused to revolve with the vertical spindle $a$ by the current of air passing over them. The ratio of velocity at which the cups move to that of the current of air passing over them is well known, obviously, therefore, by the use of a bell or other form of sounder placed at the outer or receiving end of the electric circuit. The velocity of the current at the site of my transmitting apparatus is ascertained by a very simple process.

What I claim as my invention, and desire to protect by Letters Patent, is—

1. In apparatus for indicating the volume or speed of a ventilating-current of air, the combination with a rotating vertical spindle, air-cups by which it is rotated, and a conical footstep-bearing, of an inner chamber $g$ filled with a non-conducting liquid in which the spindle is submerged, a cover $k$ inclosing the inner chamber, a cam on said spindle rotating therewith and an insulated contact-maker in the closed chamber with which the cam makes and breaks contact at each revolution and means for preventing the entrance of dust to said chamber substantially as described.

2. In apparatus for indicating the volume or speed of a current of air, the combination with a rotating vertical spindle, air-cups by which it is rotated and a footstep-bearing, of a closed chamber filled with a non-conducting liquid in which the spindle rotates, an upper bearing provided with an oil-cup, and a flange depending from the rotating arms of the air-cups into the oil-cup to seal the bearing substantially as described.

In witness whereof I have hereunto signed my name in the presence of two subscribing witnesses.

JOSEPH THOMPSON.

Witnesses:
I. OWDEN O'BRIEN,
FRANK SPARKES.